(12) United States Patent
Zhang et al.

(10) Patent No.: US 12,116,508 B2
(45) Date of Patent: Oct. 15, 2024

(54) UV CURABLE ADHESIVE

(71) Applicant: 3M INNOVATIVE PROPERTIES COMPANY, St. Paul, MN (US)

(72) Inventors: Enzhong Zhang, Shanghai (CN); Xiaoming Jiang, Shanghai (CN); Lin Yang, Shanghai (CN); Mark F. Ellis, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 568 days.

(21) Appl. No.: 17/310,443

(22) PCT Filed: Feb. 4, 2020

(86) PCT No.: PCT/IB2020/050879
§ 371 (c)(1),
(2) Date: Aug. 3, 2021

(87) PCT Pub. No.: WO2020/165692
PCT Pub. Date: Aug. 20, 2020

(65) Prior Publication Data
US 2022/0025215 A1   Jan. 27, 2022

(30) Foreign Application Priority Data
Feb. 11, 2019   (CN) .......................... 201910110780.8

(51) Int. Cl.
C09J 4/00         (2006.01)
C08F 220/18       (2006.01)
C09J 133/06       (2006.01)

(52) U.S. Cl.
CPC ............ *C09J 4/00* (2013.01); *C08F 220/1808* (2020.02); *C09J 133/066* (2013.01); *C09J 133/068* (2013.01); *C08F 2800/20* (2013.01)

(58) Field of Classification Search
None
See application file for complete search history.

(56) References Cited

U.S. PATENT DOCUMENTS

| | | |
|---|---|---|
| 5,637,646 A | 6/1997 | Ellis |
| 7,297,400 B2 | 11/2007 | Yang |
| 2012/0270038 A1 | 10/2012 | Kim |

FOREIGN PATENT DOCUMENTS

| | | |
|---|---|---|
| WO | WO2004-000961 | 12/2003 |
| WO | WO2004-000962 | 12/2003 |
| WO | WO2013-023545 | 2/2013 |
| WO | WO2013-161812 | 10/2013 |
| WO | WO2015-133517 | 9/2015 |
| WO | WO2016-008130 | 1/2016 |
| WO | WO2020-165692 | 8/2020 |

OTHER PUBLICATIONS

International Search report for PCT International Application No. PCT/IB2020/050879 mailed on May 4, 2020, 5 pages.

*Primary Examiner* — Sanza L. McClendon

(57) ABSTRACT

The present invention provides a UV curable adhesive, wherein based on a total weight of the UV curable adhesive, the UV curable adhesive comprises: from 30 to 70 wt % of an acrylate oligomer; from 20 to 65 wt % of an acrylate monomer; from 1 to 10 wt % of acryloyl morpholine; from 1 to 15 wt % of a photo initiator; and from 0 to 10 wt % of a thickening agent, wherein the acrylate oligomer has a weight average molecular weight in a range of from 10,000 to 100,000 grams/mole and a glass transition temperature in a range of from −50 to 0° C. According to the technical solution of the present invention, the adhesive layer obtained from curing the UV curable adhesive is relatively thick (for example, 0.8 mm), and the adhesive layer has good adhesion property, cohesive force, and tackiness.

5 Claims, No Drawings

UV CURABLE ADHESIVE

CROSS REFERENCE TO RELATED APPLICATIONS

This application is a national stage filing under 35 U.S.C. 371 of PCT/IB2020/050879, filed Feb. 4, 2020, which claims the benefit of Chinese Patent Application No. 201910110780.8, filed Feb. 11, 2019, the disclosure of which is incorporated by reference in its/their entirety herein.

TECHNICAL FIELD

The present invention relates to the technical field of pressure sensitive adhesives, and particularly, to a UV curable adhesive.

BACKGROUND

Compared with traditional pressure sensitive adhesives, foam tapes have higher adhesion and sealing properties; compared with liquid glues, on the other hand, foam tapes also require die cutting. This traditional method wastes materials and limits the sizes of the finished products. In this regard, printing and dispensing techniques make it possible to make narrow bonding solutions and automated production, and also make it possible to save materials. According to the technique, a liquid glue is printed or coated on a substrate through a template to form an adhesive sample of a certain size and shape, which then is cured under radiation to form an adhesive film. The compositions of the adhesive vary depending on the performance and process requirements. By virtue of certain combinations of oligomers, not only an interpenetrating network system of polymers can be obtained, excellent properties of the adhesive can also be seen through these combinations. WO 2013/161812 (Watanabe) discloses an UV curable adhesive composition, comprising: (a) a polyfunctional urethane acrylate oligomer having a weight average molecular weight in a range of from 10,000 to 100,000 grams/mole; (b) a tackifier (an adhesion promoter), (c) a monofunctional epoxy ester (meth)acrylate, and (d) a photopolymerization initiator. Although the disclosed samples can achieve a peel strength of 2 N/mm, the compositions contains not only a purified tackifier, but also a polyurethane acrylate oligomer. Further, U.S. Pat. No. 7,297,400 B2 (Yang et al.) discloses a curable pressure sensitive adhesive composition, comprising an acrylate copolymer, a mono-acrylate oligomer, a multi-acrylate oligomer (each acrylate oligomer containing 2-5 functional groups), and a photoinitiator. The adhesive has the characteristics and forms of pressure sensitive adhesives. Although the disclosed sample in the above patent achieves a peel strength of 1.2 N/mm on PC and PMMA substrates, the adhesive needs to be post-cured to increase the bonding strength, rather than having the strength as a liquid film. WO 2015/133517 (Takahashi) discloses a composition, comprising a polyurethane acrylate resin having 2 or more functional groups (i.e., (meth)acryloyl groups), a urethane-free polyfunctional acrylate resin, and a polymerization initiator. The composition is used in the preparation of a stress-relieving coating. Currently, these techniques can only produce an adhesive layer with a limited thickness (less than 0.2 mm). When the thickness of the UV-curable adhesive layer is more than 0.2 mm, the problem of the surface layer being over-cured and the bottom layer being under-cured is seen, thereby limiting the application scope of the UV-curable adhesive having a certain thickness.

To date, there is still a need in the art to develop a UV curable adhesive that can be used in printing or dispensing techniques to produce thicker (e.g., 0.8 mm or more) adhesive layers.

SUMMARY

In view of the technical problems above, an object of the present invention is to provide a UV curable adhesive that can be used in printing or dispensing process for preparing a thicker adhesive layer; The cured thicker adhesive layer has good adhesion, cohesive force, and tackiness.

The present inventors have accomplished the present invention through intensive research.

According to one aspect of the present invention, a UV curable adhesive is provided, wherein based on a total weight of the UV curable adhesive, the UV curable adhesive comprises:

30 to 70 wt. % of acrylate oligomer;
20 to 65 wt. % of acrylate monomer;
1 to 10 wt. % of acryloyl morpholine monomer;
1 to 15 wt. % of a photoinitiator; and
0-10 wt. % of a thickening agent, wherein the acrylate oligomer has a weight average molecular weight in the range of from 10,000 to 100,000 grams/mole that test by Gel Permeation Chromatography and a glass transition temperature in the range of from −50 to 0° C. that test by Differential Scanning calorimeter.

According to some preferred embodiments of the present invention, the acrylate oligomer has a (meth)acryloyl functionality of 1 or 2.

According to some preferred embodiments of the present invention, the acrylate oligomer comprises a repeating unit derived from one or a plurality of compounds selected from ethylhexyl acrylate, isobornyl acrylate, 2-ethylhexyl acrylate, acrylic acid, glycidyl methacrylate, methyl acrylate, and n-butyl acrylate; and a repeating unit derived from one or a plurality of compounds selected from hydroxyethyl acrylate and hydroxypropyl acrylate.

According to some preferred embodiments of the present invention, the acrylate oligomer has a structure represented by a general Formula (1) below:

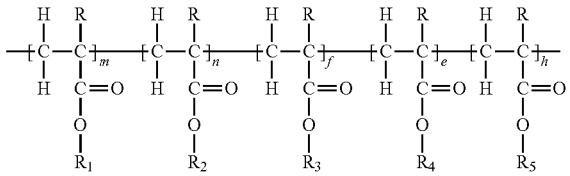

where R represents hydrogen or methyl; $R_1$ is isobornyl; $R_2$ is 2-ethylhexyl or isoctyl; $R_3$ is hydroxypropyl; $R_4$ is $-CH_2CH_2CH_2O(CO)NHCH_2CH_2C(CH_3)=CH_2$; $R_5$ is glycidyl ($-CH_2-(CH_2CH_2O)$); and m, n, f, e, and h are integers from 0 to 500, provided that m, n, and h are not all 0, and f and e are not both 0.

According to some preferred embodiments of the present invention, the acrylate monomer is one or a plurality of monomers selected from isoctyl acrylate, 2-ethylhexyl acrylate, isobornyl acrylate, phenyoxyethyl acrylate, and caprolactone acrylate.

According to some preferred embodiments of the present invention, the photoinitiator is a free radical photoinitiator.

According to some preferred embodiments of the present invention, the UV curable adhesive further comprises one or a plurality of a pigment, a photostabilizer, and a heat stabilizer.

Compared with the prior art, the present invention has the following beneficial effects:

1) The UV curable adhesive can be cured directly when exposed in the air.

2) By using an acrylate oligomer with specific molecular weight and glass transition temperature in combination with acrylate monomer and acryloyl morpholine, it is possible to control the reactivity of the system and the density of the formed network to provide a network interpenetrating performance.

3) The acrylic polymer chain alone can form a good crosslinking system, which has good tack performance and cohesive strength.

4) When the adhesive film has a greater thickness (e.g., 0.8 mm or more), it can still be cured under strong UV radiation, and still has good tack performance and cohesive strength, and the thickness ranges from 0.05 to 1 mm.

5) The adhesive layer obtained by curing the UV curable adhesive achieves good adhesion property, cohesive force, and tackiness simultaneously.

DETAILED DESCRIPTION AND ILLUSTRATIVE EMBODIMENTS

The present invention will be further described in detail below in conjunction with the embodiments. It will be appreciated that other embodiments are considered, and can be practiced without departing from the scope and spirit of the present invention. Therefore, the following detailed description is non-limiting.

Unless otherwise specified, all numbers used in this Description and the Claims representing the characteristic sizes and quantities and physical properties should be understood as being modified by the term "approximately" under any and all circumstances. Therefore, unless stated on the contrary, parameters in numerical values listed in the above description and in the attached claims are all approximate values, and those of skill in the art are capable of seeking to obtain desired properties by taking advantage of contents of the teachings disclosed herein, and changing these approximate values appropriately. The use of a numeric value range represented by endpoints includes all numbers within such range and any range within such range, e.g., 1 to 5 includes 1, 1.1, 1.3, 1.5, 2, 2.75, 3, 3.80, 4 and 5 etc.

The present invention provides a radiation-curable pressure sensitive adhesive. According to the technical solution of the present invention, when the UV curable adhesive is cured by using ultraviolet light, a loose interpenetrating network system is formed by crosslinking an acrylate oligomer with a specific acrylate monomer and acryloyl morpholine, the oligomer having a different weight average molecular weight and glass transition temperature. Thus, good effects can be achieved in terms of the adhesion property, cohesive force, and tackiness.

In addition, in the present invention, a 1-2 ethylenically unsaturated group acrylate oligomer having a low glass transition temperature is used as a crosslinking agent. Even if a high curing energy is used during curing, the resulting adhesive film can still avoid the problem of an over-cured surface layer and under-cured bottom layer, and has good adhesion property, cohesive force, and tackiness. Further, in accordance with the technical solutions in the present invention, a nitrogen-containing monomer acryloyl morpholine is used to introduce weak physical crosslinking. Such crosslinking is not affected by the curing energy. When the curing energy is increased, a thicker adhesive film still has a looser network structure, which in turn makes the curing of the surface layer and the bottom layer of the thicker film more uniform.

Specifically, the present invention provides a UV curable adhesive, wherein based on a total weight of the UV curable adhesive, the UV curable adhesive comprises:

30 to 70 wt. % of acrylate oligomer;
20 to 65 wt. % of acrylate monomer;
1 to 10 wt. % of acryloyl morpholine monomer;
1 to 15 wt. % of a photoinitiator; and
0-10 wt. % of a thickening agent, wherein the acrylate oligomer has a weight average molecular weight in the range of from 10,000 to 100,000 grams/mole and a glass transition temperature in the range of from $-50$ to $0°$ C.

According to some embodiments of the present invention, when the UV curable adhesive is cured, an interpenetrating network system is formed by crosslinking an acrylate oligomer with an acrylate monomer and acryloyl morpholine, such that the adhesive layer has good processability and mechanical performance.

When the glass transition temperature of acrylate oligomer is too high (i.e. $10°$ C.), the surface of the adhesive film formed after UV curing could not have a good tackiness; the adhesive film could not provide good interface bonding, and both the peel strength and shear strength were very poor. The glass transition temperature range of the acrylate oligomer needs to meet the requirements (i.e., in the range of from $-50°$ C. to $0°$ C.). In some embodiments, acrylate oligomers having a glass transition temperature of at least $-10°$ C., at least $-30°$ C., and at least $-50°$ C., and a functionality of 1-2 were used, which give rise to adhesive films having high adhesion and dynamic shear strength. This demonstrates that when the acrylate oligomer has a glass transition temperature ranging from $-50°$ C. to $0°$ C., the adhesive film has a good overall performance in terms of the peel force and dynamic shear strength.

The acrylate oligomer is an oligomer having acrylate units as a main building block. Preferably, the acrylate oligomer comprises a repeating unit derived from one or a plurality of compounds selected from isoctyl acrylate, isobornyl acrylate, 2-ethylhexyl acrylate, acrylic acid, glycidyl methacrylate, methyl acrylate, and n-butyl acrylate; and a repeating unit derived from one or a plurality of compounds selected from hydroxyethyl acrylate and hydroxypropyl acrylate.

Preferably, the acrylate oligomer has a functionality (vinyl group) of 1 to 2. The method for determining the functionality comprises: determining the number average molecular weight (Mn) by using gel permeation chromatography (GPC), and calculating the functionality by combining the Mn determined by GPC and the total number of functional groups determined by nuclear magnetic resonance spectroscopy (NMR). When the functionality of the acrylate oligomer is in the above range, the reactivity of the acrylate oligomer can be controlled. The density of the loose interpenetrating network system formed with the acrylate oligomer can be controlled depending on the desired properties, such as the adhesion property, cohesive force, and tackiness. Preferably, the acrylate oligomer has an average functionality of 1.5.

When the acrylate oligomer having a functionality of 3 is used, the adhesive film formed by UV curing is too densely crosslinked, resulting to the surface being not able to provide good interface bonding; both the peel strength and shear strength were very poor. When the acrylate oligomer having a functionality of less than 1 is used. Because the crosslinked network was too loose, the adhesive film could not provide good cohesive force; and the shear strength is weak, and cohesional failure occurred. The functionality of acrylate oligomer needs to meet the requirements (i.e., in the range of from 1 to 2).

According to a preferred embodiment of the present invention, the acrylate oligomer has a weight average molecular weight in the range of from 10,000 to 100,000 grams/mole, and preferably in the range of from 40,000 to 60,000 grams/mole; and a glass transition temperature in a range of from −50° C. to 0° C., and preferably in the range of from −40° C. to −10° C. The glass transition temperature can be at least −50° C., at least −45° C., at least −40° C., or at least −35° C. and up to 0° C., up to −5° C., up to −10° C., or up to −15° C. When the weight average molecular weight and the glass transition temperature of the acrylate oligomer and the relationship there between are controlled to fall within the above ranges, good effects for the obtained adhesive layer can be obtained in terms of the adhesion property, cohesive force, and tackiness.

Illustratively, the acrylate oligomer can be prepared through the method disclosed in U.S. Pat. No. 5,637,646 (Ellis). The method comprises: (1) adding a chain transfer agent and an initiator to a (meth)acrylate monomer M and an acrylate monomer N respectively, where the (meth)acrylate monomer M is one or more selected from isoctyl acrylate, isobornyl acrylate, 2-ethylhexyl acrylate, acrylic acid, glycidyl methacrylate, methyl acrylate, and n-butyl acrylate; and the acrylate monomer N is one or two selected from hydroxyethyl acrylate and hydroxypropyl acrylate; and copolymerizing the (meth)acrylate monomer M and the acrylate monomer N to form an oligomer S, where oligomer(s) S of different molecular weights can be obtained by controlling the dosage of the chain transfer agent; and (2) reacting the oligomer S containing hydroxyl group with a (meth)acryloyl compound, where the (meth)acryloyl compound is one or two selected from isocyanoethyl acrylate and isocyanoethyl methacrylate; and acrylate oligomer(s) having different functionalities, weight average molecular weights, and glass transition temperatures can be obtained using oligomer(s) S of different molecular weights and by controlling the amount of the (meth)acryloyl compound added.

Moreover, the amount of the acrylate oligomer in the UV curable adhesive is from as at least 20 wt %, at least 25 wt %, at least 30 wt %, at least 35 wt %, or at least 40 wt % and up to 70 wt %, up to 65 wt %, up to 60 wt %, up to 55 wt %, or up to 50 wt %. In some embodiments, the amount of the acrylate oligomer is in a range of 30 to 70 wt %, and preferably from 20 to 60 wt %.

Some comparative results show that when the amount of the acrylate oligomer is less than 30 wt %, the adhesive film cannot provide good cohesion, resulting in weak dynamic shear strength; when the amount of the acrylate oligomer is higher than 70 wt %, the adhesive film cannot provide good tackiness, resulting in poor peel force and dynamic shear strength of the adhesive film. The amount of the acrylate oligomer needs to satisfy the amount range requirements (i.e., the amount of acrylate oligomer being in the range of from 30 to 70 wt %); and when the amount goes beyond this range, good cohesive force and adhesion property cannot be obtained.

Preferably, the acrylate oligomer has a structure represented by the following general Formula (1):

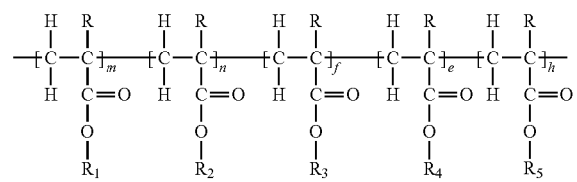

where R represents hydrogen or methyl; $R_1$ is isobornyl; $R_2$ is 2-ethylhexyl or isooctyl; $R_3$ is hydroxypropyl; $R_4$ is —$CH_2CH_2CH_2O(CO)NHCH_2CH_2C(CH_3)$=$CH_2$; $R_5$ is glycidyl (—$CH_2$—($CH_2CH_2O$)); and m, n, f, e, and h are integers from 0 to 500, provided that m, n, and h are not all 0, and f and e are not both 0.

When the UV curable adhesive is cured, a loose interpenetrating network system is formed by crosslinking an acrylate monomer with an acrylate oligomer and acryloyl morpholine, such that the adhesive layer has good processability and mechanical performance. The structure of the acrylate monomer is not particularly limited. In some preferred embodiments, the acrylate monomer is one or a plurality of monomers selected from isooctyl acrylate, 2-ethylhexyl acrylate, isobornyl acrylate, phenoxyethyl acrylate, and caprolactone acrylate. Moreover, the amount of the acrylate monomer in the UV curable adhesive is from 20 to 65 wt %, and preferably from 30 to 50 wt %.

According to a technical solution of the present invention, the UV curable adhesive comprises acryloyl morpholine as an essential component. Acryloyl morpholine, as a nitrogen-containing monomer, introduces weak physical crosslinking in the UV curable adhesive system. The nitrogen-containing monomer not limited to acryloyl morpholine, it also can be N-Vinyl-2-pyrrolidone and acrylamide. Such crosslinking is not affected by the curing energy. When the curing energy is increased, a thicker adhesive film still has a looser network structure, which in turn makes the curing of the surface layer and the bottom layer of the thicker film more uniform. Based on the total weight of the UV curable adhesive, the amount of acryloyl morpholine is from 1 to 10 wt %, preferably from 1 to 5 wt %, and most preferably from 1.5 to 3 wt %. Specific samples of acryloyl morpholine used in the present invention include 4-acryloyl morpholine.

An addition of a small amount of 4-acryloyl morpholine can significantly improve the peel force and dynamic shear force of the UV curable adhesive. When excess 4-acryloyl morpholine (i.e. 11 wt %) is added to the formulation of the UV curable adhesive, the peel force and dynamic shear performance are greatly degraded.

According to a technical solution of the present invention, the UV curable adhesive comprises a photoinitiator to initiate the crosslinking and polymerization of the acrylate oligomer and the acrylate monomer. There is no particular limitation on the type of the photoinitiator. A photoinitiator commonly used in the art can be employed. Preferably, the photoinitiator is a free radical photoinitiator. The photoinitiator can be a Type I initiator or a Type II initiator. The photoinitiators can be used alone or in combination with others. Typical examples of the photoinitiator include 2,4,6-trimethylbenzoyldiphenylphosphine oxide (for example, TPO-L produced by Double Bond Chemical Ind., Co., Ltd.) and benzophenone. Based on the total weight of the UV curable adhesive, the amount of the photoinitiator in the UV curable adhesive is from 1 to 15 wt %, and preferably from 3 to 8 wt %.

Optionally, the UV curable adhesive according to the present invention further comprises a thickening agent as an optional component. The thickening agent imparts shear thinning properties to the UV curable adhesive mixed liquid. Suitable thickening agent include, e.g., fumed silica, precipitated silica, talc, calcium carbonates, carbon black, alumina silicates, clay, zeolites, ceramics, mica, titanium dioxide, and combinations thereof. When present, the thickening agent preferably is fumed silica. The fumed silica must be hydrophobically modified silica. Preferably, a typical example of the thickening agent is HDK H-18 manufactured by WACKER The adhesive include a photoinitiator. Suitable photoinitiators are capable of promoting free radical polymerization, crosslinking, or both, of the ethylenically unsaturated moiety on exposure to radiation of a suitable wavelength and intensity. The photoinitiator can be used alone, or in combination with a suitable donor compound or a suitable coinitiator. Useful photoinitiators include, e.g., "alpha cleavage type" photoinitiators including, e.g., benzyl dimethyl ketal, benzoin ethers, hydroxy alkyl phenyl ketones, benzoyl cyclohexanol, dialkoxy acetophenones, 1-hydroxycyclohexyl phenyl ketone, trimethylbenzoyl phosphine oxides, methyl thio phenyl morpholino ketones and morpholino phenyl amino ketones; hydrogen abstracting photoinitiators, which include a photoinitiator and a coinitiator, based on benzophenones, thioxanthenes, benzyls, camphorquinones, and ketocoumarins; and combinations thereof. Preferred photoinitiators include acylphosphine oxides including, e.g., bis(2,4,6-trimethylbenzoyl)-phenylphosphine oxide, bis(2,6-dimethoxybenzoyl)-(2,4,4-trimethylpentyl)phosphine oxide, and 2,4,4-trimethylbenzoyl diphenylphosphine oxide. Useful commercially available photoinitiators are available under the following trade designations IRGACURE 369 morpholino phenyl amino ketone, IRGACURE 819 bis (2,4,6-trimethylbenzoyl)-phenylphosphine oxide and its preferred form CGI819XF, IRGACURE CGI 403 bis(2,6-dimethoxybenzoyl)-(2,4,4-trimethylpentyl) phosphine oxide, TPO-L 50-100% Diphenyl (2,4,6,-trimethylbenzoyl) phosphine oxide 25-50% Methyl phenylglyoxylate.

According to the technical solution of the present invention, the UV curable adhesive further comprises one or a plurality of a pigment, and a heat stabilizer, to impart other desired properties to the UV curable adhesive. There is no particular limitation on the specific types of the pigment, photostabilizer, and heat stabilizer, which can be specifically decided by a person skilled in the art.

Hereinafter, the present invention is described in detail by way of embodiments. It is to be understood that the description and embodiments are intended to be illustrating, rather than limiting the present invention. The scope of the present invention is defined by the appended claims.

EXAMPLES

In the present invention, unless otherwise indicated, the used reagents are all commercially available and are used directly without further purification. Further, the "%" mentioned is "wt %", and the "parts" mentioned are "parts by weight."

Test Method

The various UV curable adhesives prepared in the examples and comparative examples are tested for the adhesion property (peel force at 180 degree) and cohesive force (dynamic shear strength) according to the specific methods listed below.

Peel Force at 180 Degree

The adhesive samples obtained from the embodiments or the comparative examples are cut into adhesive strips of 12.7 mm in width; the adhesive strips are attached to a stainless steel plate. The stainless steel plate with the adhesive strips is rolled back and forth by using a 2 Kg roller (Rolldown, purchased from Cheminstruments, USA). After the preparation, the stainless steel plate to which the adhesive samples are attached is allowed to stand at room temperature for 20 minutes; and then the peel force is tested at a peeling speed of 305 mm/min (Instron 3300, purchased from Instron, USA). The measurements of 5 peel tests are recorded and the average value is taken as a peel force at 180 degree (unit: N/mm).

Dynamic Shear Strength

The adhesive samples obtained from the embodiments or the comparative examples are cut into adhesive strips of 25.4 mm×25.4 mm; the adhesive strips are attached to a stainless steel plate, which is rolled back and forth by using a 2 Kg roller (Rolldown, purchased from Cheminstruments, USA). After the preparation, the stainless steel plate to which the adhesive samples are attached is allowed to stand at room temperature for 24 hrs. Then the shear strength is tested at a draw speed of 25 mm/min (Instron 3300, purchased from Instron, USA). The measurements of 5 shear strength tests are recorded and the average value is taken as a dynamic shear strength (unit: MPa).

Synthesis Example 1 (Synthesis of Acrylate Oligomer A)

An acrylate oligomer A was prepared according to the method disclosed in U.S. Pat. No. 5,637,646. Specifically, 130 g of isooctyl acrylate, 100 g of hydroxypropyl acrylate, 220 g of isobornyl acrylate, 50 g of glycidyl methacrylate, and 0.028 g of VAZO 52 (2,2'-azobis(2,4-dimethylvaleronitrile)), and 3.5 g of isooctyl mercaptoacetate were added to a 2-liter stainless-steel batch reactor. The mixture was maintained at 25° C. Bubbling the solution with nitrogen for 20 minutes to displace oxygen from the mixture and the reactor headspace (space not occupied by the reaction mixture in the reactor). The reactor was pressurized to about 500 KPa with nitrogen and sealed. The reaction solution was stirred with an agitator (a 3-blade, backswept agitator) in the reactor at a rotational speed of about 75 rpm. The temperature of the reaction mixture was raised to 65° C. by circulating temperature-controlled water in the reactor jacket. Once the polymerization was initiated, the temperature control system was set such that the water circulating in the jacket was maintained at a temperature 10° C. higher than the temperature of the batch, to form an adiabatic reaction condition. After the oxygen was removed and the reaction continued for about 3 minutes, the pressure of the reactor was reduced to 140 KPa and then returned to about 500 KPa through pressurization with nitrogen. After about 10 minutes of reaction, the temperature of the batch reached about 140° C. The temperature control system of the jacket could not keep up with the temperature rising speed of the batch. At this point, the water in the jacket was drained and the reaction temperature continued to rise. After 7 minutes, cooling water was introduced into the reactor jacket when the reaction temperature reached the maximum.

Once the batch was cooled to 60° C., the nitrogen pressure in the reactor was released. Subsequently, 0.1 g of VAZO 52

(2,2'-azobis(2,4-dimethylvaleronitrile)), 0.2 g of VAZO 88 (2,2'-azobis(cyclohexylcarbonitrile)), 0.28 g of di-t-pentyl peroxide, and 1.5 g of isooctyl mercaptoacetate dissolved in 10 g of ethylhexyl acrylate were added to the reaction mixture.

The temperature control system of the reactor was set to heat the batch to 65° C. When the batch was heated to 65° C., the rotational speed of the agitator was set to about 75 rpm. The oxygen in the reaction mixture was depleted by: evacuating the reactor headspace for about 30 seconds to release the nitrogen trapped in the first reaction cycle from the reaction mixture, which caused the reaction mixture to bubble violently. The reactor was pressurized to about 140 KPa with nitrogen for 1 min. The reactor was additionally evacuated for about 30 seconds to remove the trapped nitrogen from the reaction mixture; and then the reactor headspace was pressurized to 500 KPa for about 1 minute. The pressure in the reactor pressure was reduced to about 140 KPa for about 1 minute. Finally, the reactor was pressurized to 500 KPa with nitrogen and sealed.

Once the mixture reached 65° C., polymerization was initiated and the temperature control system was set so that the water circulating in the jacket was maintained at a temperature 10° C. higher than the temperature of the batch, so as to form an adiabatic reaction condition. The temperature of the batch kept rising for about one hour. Once the batch temperature reached the maximum, the water in the jacket was drained and steam with a pressure of about 850 KPa was applied to the jacket to maintain the reaction mixture at about 165° C. for an additional 40 minutes. The reaction temperature was then lowered to 110° C.; and the solution was bubbled with oxygen for 10 minutes. 4 g of isocyanoethyl methacrylate was added to the reaction mixture, and the temperature was kept the same. The reactor headspace was pressurized to 500 KPa with oxygen for one hour, after which the temperature was lowered to 60° C. and the material was discharged.

Synthesis Example 2 (Synthesis of Acrylate Oligomer B)

An acrylate oligomer B was prepared according to the method disclosed in U.S. Pat. No. 5,637,646 (Ellis). Specifically, 190 g of isooctyl acrylate, 100 g of hydroxypropyl acrylate, 160 g of isobornyl acrylate, 50 g of glycidyl methacrylate, and 0.077 g of VAZO 52 (2,2'-azobis(2,4-dimethylvaleronitrile)), and 2 g of isooctyl mercaptoacetate were added to a 2-liter stainless-steel batch reactor. The mixture was maintained at 25° C. Bubbling the solution with nitrogen for 20 minutes to displace oxygen from the mixture and the reactor headspace (space not occupied by the reaction mixture in the reactor). The reactor was pressurized to about 500 KPa with nitrogen and sealed. The reaction solution was stirred with an agitator (a 3-blade, backswept agitator) in the reactor at a rotational speed of about 75 rpm. The temperature of the reaction mixture was raised to 65° C. by circulating temperature-controlled water in the reactor jacket. Once the polymerization was initiated, the temperature control system was set such that the water circulating in the jacket was maintained at a temperature 10° C. higher than the temperature of the batch, to form an adiabatic reaction condition. After the oxygen was removed and the reaction continued for about 3 minutes, the pressure of the reactor was reduced to 140 KPa and then returned to about 500 KPa through pressurization with nitrogen. After about 10 minutes of reaction, the temperature of the batch reached about 140° C. The temperature control system of the jacket could not keep up with the temperature rising speed of the batch. At this point, the water in the jacket was drained and the reaction temperature continued to rise. After 7 minutes, cooling water was introduced into the reactor jacket when the reaction temperature reached the maximum.

Once the batch was cooled to 60° C., the nitrogen pressure in the reactor was released. Subsequently, 0.1 g of VAZO 52 (2,2'-azobis(2,4-dimethylvaleronitrile)), 0.2 g of VAZO 88 (2,2'-azobis(cyclohexylcarbonitrile)), 0.28 g of di-t-pentyl peroxide, and 0.7 g of isooctyl mercaptoacetate dissolved in 10 g of ethylhexyl acrylate were added to the reaction mixture.

The temperature control system of the reactor was set to heat the batch to 65° C. When the batch was heated to 65° C., the rotational speed of the agitator was set to about 75 rpm. The oxygen in the reaction mixture was depleted by: evacuating the reactor headspace for about 30 seconds to release the nitrogen trapped in the first reaction cycle from the reaction mixture, which caused the reaction mixture to bubble violently. The reactor was pressurized to about 140 KPa with nitrogen for 1 min. The reactor was additionally evacuated for about 30 seconds to remove the trapped nitrogen from the reaction mixture; and then the reactor headspace was pressurized to 500 KPa for about 1 minute. The pressure in the reactor pressure was reduced to about 140 KPa for about 1 minute. Finally, the reactor was pressurized to 500 KPa with nitrogen and sealed.

Once the mixture reached 65° C., polymerization was initiated and the temperature control system was set so that the water circulating in the jacket was maintained at a temperature 10° C. higher than the temperature of the batch, so as to form an adiabatic reaction condition. The temperature of the batch kept rising for about one hour. Once the batch temperature reached the maximum, the water in the jacket was drained and steam with a pressure of about 850 KPa was applied to the jacket to maintain the reaction mixture at about 165° C. for an additional 40 minutes. The reaction temperature was then lowered to 110° C.; and the solution was bubbled with oxygen for 10 minutes. 4 g of isocyanoethyl methacrylate was added to the reaction mixture, and the temperature was kept the same. The reactor headspace was pressurized to 500 KPa with oxygen for one hour, after which the temperature was lowered to 60° C. and the material was discharged.

Synthesis Example 3 (Synthesis of Acrylate Oligomer C)

An acrylate oligomer C was prepared according to the method disclosed in U.S. Pat. No. 5,637,646 (Ellis). Specifically, 260 g of isooctyl acrylate, 100 g of hydroxypropyl acrylate, 90 g of isobornyl acrylate, 50 g of glycidyl methacrylate, and 0.077 g of VAZO 52 (2,2'-azobis(2,4-dimethylvaleronitrile)), and 2 g of isooctyl mercaptoacetate were added to a 2-liter stainless-steel batch reactor. The mixture was maintained at 25° C. Bubbling the solution with nitrogen for 20 minutes to displace oxygen from the mixture and the reactor headspace (space not occupied by the reaction mixture in the reactor). The reactor was pressurized to about 500 KPa with nitrogen and sealed. The reaction solution was stirred with an agitator (a 3-blade, backswept agitator) in the reactor at a rotational speed of about 75 rpm. The temperature of the reaction mixture was raised to 65° C. by circulating temperature-controlled water in the reactor jacket. Once the polymerization was initiated, the temperature control system was set such that the water circulating in the jacket was maintained at a temperature 10° C. higher than the temperature of the batch, to form an adiabatic reaction condition. After the oxygen was removed and the reaction continued for about 3 minutes, the pressure of the reactor was reduced to 140 KPa and then returned to about 500 KPa through pressurization with nitrogen. After about 10 minutes of reaction, the temperature of the batch reached about 140° C. The temperature control system of the jacket could not keep up with the temperature rising speed of the batch. At this point, the water in the jacket was drained and the reaction temperature continued to rise. After 7 minutes, cooling water was introduced into the reactor jacket when the reaction temperature reached the maximum.

Once the batch was cooled to 60° C., the nitrogen pressure in the reactor was released. Subsequently, 0.1 g of VAZO 52 (2,2'-azobis(2,4-dimethylvaleronitrile)), 0.2 g of VAZO 88 (2,2'-azobis(cyclohexylcarbonitrile)), 0.28 g of di-t-pentyl peroxide, and 0.7 g of isooctyl mercaptoacetate dissolved in 10 g of ethylhexyl acrylate were added to the reaction mixture.

The temperature control system of the reactor was set to heat the batch to 65° C. When the batch was heated to 65° C., the rotational speed of the agitator was set to about 75 rpm. The oxygen in the reaction mixture was depleted by: evacuating the reactor headspace for about 30 seconds to release the nitrogen trapped in the first reaction cycle from the reaction mixture, which caused the reaction mixture to bubble violently. The reactor was pressurized to about 140 KPa with nitrogen for 1 min. The reactor was additionally evacuated for about 30 seconds to remove the trapped nitrogen from the reaction mixture; and then the reactor headspace was pressurized to 500 KPa for about 1 minute. The pressure in the reactor pressure was reduced to about 140 KPa for about 1 minute. Finally, the reactor was pressurized to 500 KPa with nitrogen and sealed.

Once the mixture reached 65° C., polymerization was initiated and the temperature control system was set so that the water circulating in the jacket was maintained at a temperature 10° C. higher than the temperature of the batch, so as to form an adiabatic reaction condition. The temperature of the batch kept rising for about one hour. Once the batch temperature reached the maximum, the water in the jacket was drained and steam with a pressure of about 850 KPa was applied to the jacket to maintain the reaction mixture at about 165° C. for an additional 40 minutes. The reaction temperature was then lowered to 110° C.; and the solution was bubbled with oxygen for 10 minutes. 2.5 g of isocyanoethyl methacrylate was added to the reaction mixture, and the temperature was kept the same. The reactor headspace was pressurized to 500 KPa with oxygen for one hour, after which the temperature was lowered to 60° C. and the material was discharged.

Synthesis Example 4 (Synthesis of Acrylate Oligomer D)

An acrylate oligomer D was prepared according to the method disclosed in U.S. Pat. No. 5,637,646 (Ellis). Specifically, 360 g of ethylhexyl acrylate, 100 g of hydroxypropyl acrylate, 40 g of isobornyl acrylate, 0.077 g of VAZO 52 (2,2'-azobis(2,4-dimethylvaleronitrile)), and 2 g of isooctyl mercaptoacetate were added to a 2-liter stainless-steel batch reactor. The mixture was maintained at 25° C. Bubbling the solution with nitrogen for 20 minutes to displace oxygen from the mixture and the reactor headspace (space not occupied by the reaction mixture in the reactor). The reactor was pressurized to about 500 KPa with nitrogen and sealed. The reaction solution was stirred with an agitator (a 3-blade, backswept agitator) in the reactor at a rotational speed of about 75 rpm. The temperature of the reaction mixture was raised to 65° C. by circulating temperature-controlled water in the reactor jacket. Once the polymerization was initiated, the temperature control system was set such that the water circulating in the jacket was maintained at a temperature 10° C. higher than the temperature of the batch, to form an adiabatic reaction condition. After the oxygen was removed and the reaction continued for about 3 minutes, the pressure of the reactor was reduced to 140 KPa and then returned to about 500 KPa through pressurization with nitrogen. After about 10 minutes of reaction, the temperature of the batch reached about 140° C. The temperature control system of the jacket could not keep up with the temperature rising speed of the batch. At this point, the water in the jacket was drained and the reaction temperature continued to rise. After 7 minutes, cooling water was introduced into the reactor jacket when the reaction temperature reached the maximum.

Once the batch was cooled to 60° C., the nitrogen pressure in the reactor was released. Subsequently, 0.1 g of VAZO 52 (2,2'-azobis(2,4-dimethylvaleronitrile)), 0.2 g of VAZO 88 (2,2'-azobis(cyclohexylcarbonitrile)), 0.28 g of di-t-pentyl peroxide, and 0.7 g of isooctyl mercaptoacetate dissolved in 10 g of ethylhexyl acrylate were added to the reaction mixture.

The temperature control system of the reactor was set to heat the batch to 65° C. When the batch was heated to 65° C., the rotational speed of the agitator was set to about 75 rpm. The oxygen in the reaction mixture was depleted by: evacuating the reactor headspace for about 30 seconds to release the nitrogen trapped in the first reaction cycle from the reaction mixture, which caused the reaction mixture to bubble violently. The reactor was pressurized to about 140 KPa with nitrogen for 1 min. The reactor was additionally evacuated for about 30 seconds to remove the trapped nitrogen from the reaction mixture; and then the reactor headspace was pressurized to 500 KPa for about 1 minute. The pressure in the reactor pressure was reduced to about 140 KPa for about 1 minute. Finally, the reactor was pressurized to 500 KPa with nitrogen and sealed.

Once the mixture reached 65° C., polymerization was initiated and the temperature control system was set so that the water circulating in the jacket was maintained at a temperature 10° C. higher than the temperature of the batch, so as to form an adiabatic reaction condition. The temperature of the batch kept rising for about one hour. Once the batch temperature reached the maximum, the water in the jacket was drained and steam with a pressure of about 850 KPa was applied to the jacket to maintain the reaction mixture at about 165° C. for an additional 40 minutes. The reaction temperature was then lowered to 110° C.; and the solution was bubbled with oxygen for 10 minutes. 2.5 g of isocyanoethyl methacrylate was added to the reaction mixture, and the temperature was kept the same. The reactor headspace was pressurized to 500 KPa with oxygen for one hour, after which the temperature was lowered to 60° C. and the material was discharged.

Synthesis Example 5 (Synthesis of Acrylate Oligomer E)

An acrylate oligomer E was prepared according to the method disclosed in U.S. Pat. No. 5,637,646 (Ellis). Specifically, 190 g of isooctyl acrylate, 100 g of hydroxypropyl acrylate, 160 g of isobornyl acrylate, 50 g of glycidyl methacrylate, and 0.028 g of VAZO 52 (2,2'-azobis(2,4- dimethylvaleronitrile)), and 3.5 g of isooctyl mercaptoacetate were added to a 2-liter stainless-steel batch reactor. The mixture was maintained at 25° C. Bubbling the solution with nitrogen for 20 minutes to displace oxygen from the mixture and the reactor headspace (space not occupied by the reaction mixture in the reactor). The reactor was pressurized to about 500 KPa with nitrogen and sealed. The reaction solution was stirred with an agitator (a 3-blade, backswept agitator) in the reactor at a rotational speed of about 75 rpm. The temperature of the reaction mixture was raised to 65° C. by circulating temperature-controlled water in the reactor jacket. Once the polymerization was initiated, the temperature control system was set such that the water circulating in the jacket was maintained at a temperature 10° C. higher than the temperature of the batch, to form an adiabatic reaction condition. After the oxygen was removed and the reaction continued for about 3 minutes, the pressure of the reactor was reduced to 140 KPa and then returned to about 500 KPa through pressurization with nitrogen. After about 10 minutes of reaction, the temperature of the batch reached about 140° C. The temperature control system of the jacket could not keep up with the temperature rising speed of the batch. At this point, the water in the jacket was drained and the reaction temperature continued to rise. After 7 minutes, cooling water was introduced into the reactor jacket when the reaction temperature reached the maximum.

Once the batch was cooled to 60° C., the nitrogen pressure in the reactor was released. Subsequently, 0.1 g of VAZO 52 (2,2'-azobis(2,4-dimethylvaleronitrile)), 0.2 g of VAZO 88 (2,2'-azobis(cyclohexylcarbonitrile)), 0.28 g of di-t-pentyl peroxide, and 1.5 g of isooctyl mercaptoacetate dissolved in 10 g of ethylhexyl acrylate were added to the reaction mixture.

The temperature control system of the reactor was set to heat the batch to 65° C. When the batch was heated to 65° C., the rotational speed of the agitator was set to about 75 rpm. The oxygen in the reaction mixture was depleted by: evacuating the reactor headspace for about 30 seconds to release the nitrogen trapped in the first reaction cycle from the reaction mixture, which caused the reaction mixture to bubble violently. The reactor was pressurized to about 140 KPa with nitrogen for 1 min. The reactor was additionally evacuated for about 30 seconds to remove the trapped nitrogen from the reaction mixture; and then the reactor headspace was pressurized to 500 KPa for about 1 minute. The pressure in the reactor pressure was reduced to about 140 KPa for about 1 minute. Finally, the reactor was pressurized to 500 KPa with nitrogen and sealed.

Once the mixture reached 65° C., polymerization was initiated and the temperature control system was set so that the water circulating in the jacket was maintained at a temperature 10° C. higher than the temperature of the batch, so as to form an adiabatic reaction condition. The temperature of the batch kept rising for about one hour. Once the batch temperature reached the maximum, the water in the jacket was drained and steam with a pressure of about 850 KPa was applied to the jacket to maintain the reaction mixture at about 165° C. for an additional 40 minutes. The reaction temperature was then lowered to 110° C.; and the solution was bubbled with oxygen for 10 minutes. 8 g of isocyanoethyl methacrylate was added to the reaction mixture, and the temperature was kept the same. The reactor headspace was pressurized to 500 KPa with oxygen for one hour, after which the temperature was lowered to 60° C. and the material was discharged.

Synthesis Example 6 (Synthesis of Acrylate Oligomer F)

An acrylate oligomer F was prepared according to the method disclosed in U.S. Pat. No. 5,637,646 (Ellis). Specifically, 190 g of isooctyl acrylate, 100 g of hydroxypropyl acrylate, 160 g of isobornyl acrylate, 50 g of glycidyl methacrylate, and 0.028 g of VAZO 52 (2,2'-azobis(2,4-dimethylvaleronitrile)), and 3.5 g of isooctyl mercaptoacetate were added to a 2-liter stainless-steel batch reactor. The mixture was maintained at 25° C. Bubbling the solution with nitrogen for 20 minutes to displace oxygen from the mixture and the reactor headspace (space not occupied by the reaction mixture in the reactor). The reactor was pressurized to about 500 KPa with nitrogen and sealed. The reaction solution was stirred with an agitator (a 3-blade, backswept agitator) in the reactor at a rotational speed of about 75 rpm. The temperature of the reaction mixture was raised to 65° C. by circulating temperature-controlled water in the reactor jacket. Once the polymerization was initiated, the temperature control system was set such that the water circulating in the jacket was maintained at a temperature 10° C. higher than the temperature of the batch, to form an adiabatic reaction condition. After the oxygen was removed and the reaction continued for about 3 minutes, the pressure of the reactor was reduced to 140 KPa and then returned to about 500 KPa through pressurization with nitrogen. After about 10 minutes of reaction, the temperature of the batch reached about 140° C. The temperature control system of the jacket could not keep up with the temperature rising speed of the batch. At this point, the water in the jacket was drained and the reaction temperature continued to rise. After 7 minutes, cooling water was introduced into the reactor jacket when the reaction temperature reached the maximum.

Once the batch was cooled to 60° C., the nitrogen pressure in the reactor was released. Subsequently, 0.1 g of VAZO 52 (2,2'-azobis(2,4-dimethylvaleronitrile)), 0.2 g of VAZO 88 (2,2'-azobis(cyclohexylcarbonitrile)), 0.28 g of di-t-pentyl peroxide, and 1.5 g of isooctyl mercaptoacetate dissolved in 10 g of ethylhexyl acrylate were added to the reaction mixture.

The temperature control system of the reactor was set to heat the batch to 65° C. When the batch was heated to 65° C., the rotational speed of the agitator was set to about 75 rpm. The oxygen in the reaction mixture was depleted by: evacuating the reactor headspace for about 30 seconds to release the nitrogen trapped in the first reaction cycle from the reaction mixture, which caused the reaction mixture to bubble violently. The reactor was pressurized to about 140 KPa with nitrogen for 1 min. The reactor was additionally evacuated for about 30 seconds to remove the trapped nitrogen from the reaction mixture; and then the reactor headspace was pressurized to 500 KPa for about 1 minute. The pressure in the reactor pressure was reduced to about 140 KPa for about 1 minute. Finally, the reactor was pressurized to 500 KPa with nitrogen and sealed.

Once the mixture reached 65° C., polymerization was initiated and the temperature control system was set so that the water circulating in the jacket was maintained at a temperature 10° C. higher than the temperature of the batch, so as to form an adiabatic reaction condition. The temperature of the batch kept rising for about one hour. Once the batch temperature reached the maximum, the water in the jacket was drained and steam with a pressure of about 850 KPa was applied to the jacket to maintain the reaction mixture at about 165° C. for an additional 40 minutes. The reaction temperature was then lowered to 110° C.; and the solution was bubbled with oxygen for 10 minutes. 2 g of isocyanoethyl methacrylate was added to the reaction mixture, and the temperature was kept the same. The reactor headspace was pressurized to 500 KPa with oxygen for one hour, after which the temperature was lowered to 60° C. and the material was discharged.

The glass transition temperature (Tg), weight average molecular weight (Mw) and functionality of the acrylate oligomers prepared above were determined. Specifically, the glass transition temperature (Tg) was determined through differential scanning calorimetry (DSC); the weight average molecular weight (Mw) was determined by using gel permeation chromatography (GPC); and the functionality was calculated by combining the Mn determined by GPC and the total number of functional groups determined by nuclear magnetic resonance spectroscopy (NMR). The specific determination results are shown in Table 1 below.

TABLE 1

Glass transition temperature (Tg), weight average molecular weight (Mw, gram/mole) and functionality of the acrylate oligomers A-F

| Chemical names | Glass transition temperature Tg (° C.) | Weight average molecular weight (Mw, g/mole) | Functionality |
|---|---|---|---|
| Acrylate oligomer A | 10 | 39000 | 1-2 |
| Acrylate oligomer B | −10 | 37000 | 1-2 |
| Acrylate oligomer C | −30 | 67000 | 1-2 |
| Acrylate oligomer D | −50 | 67000 | 1-2 |
| Acrylate oligomer E | −10 | 37000 | 3 |
| Acrylate oligomer F | −10 | 37000 | 0-1 |

Example 1

The acrylate oligomer B, ethylhexyl acrylate (2-EHA), isobornyl acrylate (IBOA), 4-acryloyl morpholine (ACMO), the thickening agent HDK H-18, and the photoinitiator TPO-L were uniformly mixed to form a UV curable adhesive 1; based on the total weight of the UV curable adhesive, the amount of the acrylate oligomer B was 49 wt %, the amount of ethylhexyl acrylate (2-EHA) was 18 wt %, the amount of isobornyl acrylate (IBOA) was 24 wt %, the amount of 4-acryloyl morpholine (ACMO) was 2 wt %, the amount of the thickening agent HDK H-18 was 3 wt %, and the amount of the photoinitiator TPO-L was 4 wt %.

The UV curable adhesive 1 prepared above was applied to a polyester film having a thickness of 0.075 mm through a die by using a comma knife coater (available from Keywell, model KY-57A) to form a coating with a thickness of 0.8 mm. Then, the printed adhesive sample was cured for 5-10 seconds by using a UV curing machine (available from Fusion, model LIGHT HAMMER 6) at a curing energy of 6000-8000 mJ/cm$^2$, so as to obtain a polyester film having a cured coating.

As shown in Table 2 below, Examples 2 to 6 and Comparative Examples 1 to 8 were respectively obtained in the same methods as those used in Example 1, with the differences being that the types of individual components and their contents were changed.

The UV curable adhesives obtained in the Examples 1-6 and Comparative Examples 1-8 were tested for the adhesion property (peel force at 180 degree) and cohesive force (dynamic shear strength) based on the determination methods listed above.

TABLE 2

Components and contents in the UV curable adhesives prepared in the Embodiments 1-6 and Comparative Examples 1-8, and test results of the adhesion property (peel force at 180 degree) and cohesive force (dynamic shear strength) of the UV curable adhesives prepared in the Embodiments 1-6 and Comparative Examples 1-8

| Component (wt %) | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|
| Acrylate oligomer A | | | | | | | 49 | |
| Acrylate oligomer B | 49 | | | 32 | | 49 | | |
| Acrylate oligomer C | | 49 | | | | | | |
| Acrylate oligomer D | | | 49 | | 65 | | | |
| Acrylate oligomer E | | | | | | | | 49 |
| Acrylate oligomer F | | | | | | | | |
| 2-EHA | 18 | 10 | 2 | 29 | 5 | 18 | 24 | 18 |
| IBOA | 24 | 32 | 40 | 30 | 21 | 20 | 18 | 24 |
| ACMO | 2 | 2 | 2 | 2 | 2 | 6 | 2 | 2 |
| HDK ® H-18 | 3 | 3 | 3 | 3 | 3 | 3 | 3 | 3 |
| TPO-L | 4 | 4 | 4 | 4 | 4 | 4 | 4 | 4 |
| Performance test results | | | | | | | | |
| Peel force at 180 degree (N/mm) | 2.12 | 1.87 | 1.65 | 1.2 | 1.41 | 2.0 | 0.53 | 0.32 |
| Dynamic shear strength (MPa) | 2.5 | 2.35 | 1.87 | 0.72 | 1.48 | 2.5 | 0.21 | 0.13 |
| Dynamic shear failure mode | Interfacial failure | Cohesive failure | Cohesive failure | Cohesive failure | Interfacial failure | Interfacial failure | Interfacial failure | Interfacial failure |

| Component (wt %) | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|
| Acrylate oligomer A | | | | | | | |
| Acrylate oligomer B | | 27 | | 49 | 49 | 49 | 49 |
| Acrylate oligomer C | | | | | | | |
| Acrylate oligomer D | | | 75 | | | | |
| Acrylate oligomer E | | | | | | | |
| Acrylate oligomer F | 49 | | | | | | |

TABLE 2-continued

Components and contents in the UV curable adhesives prepared in the Embodiments 1-6 and Comparative Examples 1-8, and test results of the adhesion property (peel force at 180 degree) and cohesive force (dynamic shear strength) of the UV curable adhesives prepared in the Embodiments 1-6 and Comparative Examples 1-8

| | | | | | | | |
|---|---|---|---|---|---|---|---|
| 2-EHA | 18 | 31 | | 18 | 18 | 18 | 19 |
| IBOA | 24 | 33 | 16 | 26 | 25.2 | 15 | 26 |
| ACMO | 2 | 2 | 2 | 0 | 0.8 | 11 | 2 |
| HDK ® H-18 | 3 | 3 | 3 | 3 | 3 | 3 | 0 |
| TPO-L | 4 | 4 | 4 | 4 | 4 | 4 | 4 |
| Performance test results | | | | | | | |
| Peel force at 180 degree (N/mm) | 0.94 | 0.6 | 0.74 | 1.7 | 1.8 | 0.4 | 2.0 |
| Dynamic shear strength (MPa) | 0.57 | 0.12 | 0.32 | 1.2 | 1.7 | 0.3 | 2.2 |
| Dynamic shear failure mode | Cohesive failure | Cohesive failure | Interfacial failure | Interfacial failure | Interfacial failure | Interfacial failure | Interfacial failure |

The analysis of the above results is provided in what follows. The acrylate oligomer A having a glass transition temperature of 10° C. was used in Comparative Example 1. Because the glass transition temperature is too high, the surface of the adhesive film formed after UV curing did not have a good tackiness; the adhesive film could not provide good interface bonding, and both the peel strength and shear strength were very poor. In Comparative Example 2, the acrylate oligomer E having a functionality of 3 was used; the adhesive film formed by UV curing was too densely crosslinked, resulting to the surface being not able to provide good interface bonding; both the peel strength and shear strength were very poor. In Comparative Example 3, the acrylate oligomer F having a functionality of less than 1 is used. Because the crosslinked network was too loose, the adhesive film could not provide good cohesive force; and the shear strength was weak, and cohesional failure occurred. A comparison between Embodiment 4 and Comparative Example 4 shows that when the amount of the acrylate oligomer is less than 30 wt %, the adhesive film cannot provide good cohesion, resulting in weak dynamic shear strength. A comparison between Embodiment 5 and Comparative Example 5 shows that when the amount of the acrylate oligomer is higher than 70 wt %, the adhesive film cannot provide good tackiness, resulting in poor peel force and dynamic shear strength of the adhesive film. A comparison between Comparative Example 6 and Embodiment 1 shows that when 4-acryloyl morpholine is added to the formulation of the UV curable adhesive, both the peel force and dynamic shear performance are remarkably improved. A comparison between Comparative Example 7 and Embodiment 1 shows that the addition of a small amount of 4-acryloyl morpholine can significantly improve the peel force and dynamic shear force. A comparison between Comparative Example 8 and Embodiment 1 shows that when excess 4-acryloyl morpholine (11 wt %) is added to the formulation of the UV curable adhesive, the peel force and dynamic shear performance are greatly degraded. These comparative examples indicate that the glass transition temperature range of the acrylate oligomer needs to meet the requirements (i.e., in the range of from −50° C. to 0° C.). The amount of the acrylate oligomer needs to satisfy the amount range requirements (i.e., the amount of acrylate oligomer being in the range of from 30 to 70 wt %); and when the amount goes beyond this range, good cohesive force and adhesion property cannot be obtained. In Embodiments 1-6, acrylate oligomers having a glass transition temperature of −10° C., −30° C., and −50° C., and a functionality of 1-2 were used, which give rise to adhesive films having high adhesion property and dynamic shear strength. This demonstrates that when the acrylate oligomer has a glass transition temperature ranging from −50° C. to 0° C., the adhesive film with a thickness of 0.8 mm has a good overall performance in terms of the peel force and dynamic shear strength. The use of the nitrogen-containing monomer 4-acryloyl morpholine allows the adhesive film to have better stability in deep curing under UV radiation, thus further improving the peel force and dynamic shear strength of the adhesive film.

The embodiments of the present invention described above are merely illustrative of the preferred embodiments of the present invention, and are not intended to limit the concept and scope of the present invention. Various modifications and improvements can be made to the technical solution of the present invention by those skilled in the art without departing from the scope of the present invention, which are all embraced in the protection scope of the present invention as defined by appended claims.

The invention claimed is:

1. A UV curable adhesive, wherein based on a total weight of the UV curable adhesive, the UV curable adhesive comprises:
   from 30 to 70 wt % of an acrylate oligomer;
   from 20 to 65 wt % of an acrylate monomer;
   from 1 to 10 wt % of acryloyl morpholine;
   from 1 to 15 wt % of a photoinitiator; and
   from 0 to 10 wt % of a thickening agent,
   wherein the acrylate oligomer has a weight average molecular weight in a range of from 10,000 to 100,000 grams/mole, a (meth) acryloyl functionality of 1 to 2, and a glass transition temperature in a range of from −50 to 0° C. wherein the acrylate oligomer comprises a repeating unit derived from one or a plurality of compounds selected from isooctylacrylate, isobornyl acrylate, 2-ethylhexyl acrylate, acrylic acid, glycidyl methacrylate, methyl acrylate, and n-butyl acrylate; and a repeating unit derived from one or a plurality of compounds selected from hydroxyethyl acrylate and hydroxypropyl acrylate, and wherein repeating unit derived from one or the plurality of compounds selected from hydroxyethyl acrylate and hydroxypropyl acrylate are reacted with isocyanoethyl (meth) acrylate to provide the (meth) acryloyl functionality of 1 or 2.

2. The UV curable adhesive according to claim 1, wherein the acrylate oligomer has a structure represented by a general formula (1) below:

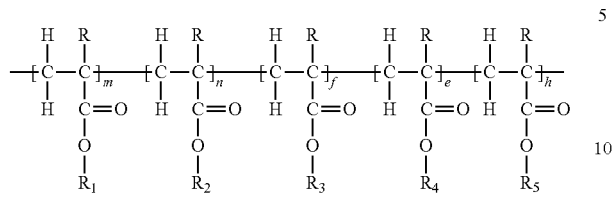

where R represents hydrogen or methyl; $R_1$ represents isobornyl; $R_2$ represents isooctyl or 2-ethylhexyl; $R_3$ represents hydroxypropyl; $R_4$ represents —$CH_2CH_2CH_2O(CO)NHCH_2CH_2C(CH_3)$=$CH_2$; $R_5$ represents glycidyl; and m, n, f, e, and h represent integers from 0 to 500, provided that m, n, and h are not all 0, and f and e are not both 0.

3. The UV curable adhesive according to claim 1, wherein the acrylate monomer is one or a plurality of monomers selected from isooctyl acrylate, 2-ethylhexyl acrylate, isobornyl acrylate, phenyoxyethyl acrylate, and caprolactone acrylate.

4. The UV curable adhesive according to claim 1, wherein the photoinitiator is a free radical photoinitiator.

5. The UV curable adhesive according to claim 1, further comprising one or a plurality of a pigment, a photostabilizer, and a heat stabilizer.

* * * * *